United States Patent [19]

Mitman

[11] Patent Number: 4,579,763

[45] Date of Patent: Apr. 1, 1986

[54] PROCESS FOR FORMING DENSIFIED TUFTED CARPET TILES BY SHRINKING PRIMARY BACKING

[75] Inventor: Jeanne L. Mitman, West Hempfield Township, Lancaster County, Pa.

[73] Assignee: Armstrong World Industries, Inc., Lancaster, Pa.

[21] Appl. No.: 745,496

[22] Filed: Jun. 17, 1985

[51] Int. Cl.$^4$ .................... B32B 3/02; B32B 33/00
[52] U.S. Cl. .................................. 428/95; 156/72; 156/84; 428/96; 428/97
[58] Field of Search ............... 428/95, 96, 97; 156/72, 156/84

[56] References Cited

U.S. PATENT DOCUMENTS 2,988,800  6/1961  White ........................... 428/95

Primary Examiner—Marion C. McCamish
Attorney, Agent, or Firm—Laird F. Miller

[57] ABSTRACT

A heat-shrinkable backing material, which preferably is a spun-bonded polyolefin backing material, is tufted with a relatively heat stable yarn and the tufted backing is subjected to a temperature of not less than 300° F. The applied temperature induces the tufted backing to shrink, thereby increasing the tuft density by not less than about 130% so as to produce an unbacked, densely tufted carpet tile. A secondary backing is then applied to provide a stable structure.

10 Claims, No Drawings

PROCESS FOR FORMING DENSIFIED TUFTED CARPET TILES BY SHRINKING PRIMARY BACKING

The present invention relates to fabric materials, and more particularly to densified tufted carpet tiles.

BACKGROUND OF THE INVENTION

Fabric materials, and particularly carpet fabrics, are usually prepared by selecting a primary backing material and tufting the backing using a needle tufting process. Standard gauge carpets are generally produced to have approximately 8 to 13 tufts per inch in the across machine direction (AMD) and 7 to 11 tufts in the machine direction (MD). Although it is often desirable to obtain more densely tufted fabrics, these materials are extremely difficult to prepare. The problems which are typically encountered include a reduction in production speed because, for example, as the tufts are brought closer together, an inherently slower shift mechanism must be used to stagger the tufts. Such complex equipment is inherently more difficult to use than conventional equipment, and overall operating efficiency is often reduced.

The textures which may be obtained are also limited because of the necessary use of smaller yarn sizes and narrower tufting gauges. Aside from being more expensive, these materials also cause difficulties with nonwoven backings because of the number of perforations which are placed in small areas of the backing. Thus, because of the physical disruption to the backing, such materials are more difficult to hand-repair in place, a procedure which can readily be achieved with conventionally tufted materials. Accordingly, it is seen that previous attempts to produce densely tufted products have often led to slower production times, increased incidences of mechanical problems and more expensive products.

PRIOR ART

The aforementioned problems have long been documented in the art; thus, it is known that the denser the weave of the backing material, the more difficult it is to obtain high quality, uniformly tufted materials. One reference which relates to an alternative tufting procedure is U.S. Pat. No. 3,238,595. That reference discloses that backing materials having a loose, open-weave construction may be needled more efficiently than tightly woven carpet backings. Therefore, the reference teaches that one may tuft a loosely woven backing and then induce the backing to shrink by applying a latex secondary backing or a thermoplastic coated scrim as a secondary backing, and then heating the combined materials such that the hot latex or the hot thermoplastic induces the loosely woven primary backing to shrink. This procedure is not suitable, however, to produce highly densified carpet tile materials.

Accordingly, one objective of the present invention is to provide a process for preparing highly densified tufted carpet tiles wherein the tuft density increases by at least 130% over the initially needled tuft density.

Another objective of the present invention is to provide densified tufted carpet tiles which comprise a secondary backing and which are not subject to curl.

These and other objectives of the present invention will become apparent from the detailed description of preferred embodiments which follow.

SUMMARY OF THE INVENTION

A heat-shrinkable backing material, which preferably is a spun-bonded polyolefin backing material, is tufted with a relatively heat stable yarn and the tufted backing is subjected to a temperature of not less than 300° F. The applied temperature induces the tufted backing to shrink, thereby increasing the tuft density by not less than about 130% so as to produce an unbacked, densely tufted carpet tile. A secondary backing is then applied to provide a stable structure.

DETAILED DESCRIPTION OF PREFERRED EMBODIMENTS

In one embodiment, the present invention relates to a process for forming a densely tufted carpet tile, said process comprising the steps of selecting a heat-shrinkable primary backing material, said backing material being capable of shrinking to not more than 85% of its initial dimensions when subjected to a temperature of not less than 300° F.; tufting said backing with a yarn which will not be adversely affected by the shrinkage conditions; placing the tufted backing on a tenter frame; subjecting the tufted backing to a temperature not less than 300° F., thereby inducing said backing to shrink so as to increase the tuft density by at least 130%; and applying a secondary backing to the densified tufted backing.

In a second embodiment, the present invention relates to a densified tufted carpet tile comprising tufting, a primary backing and a secondary backing, said tile being obtained from the heating on a tenter frame of a heat shrinkable primary backing at a temperature of not less than about 300° F. such that said backing shrank to not more than 85% of its initial dimensions, said backing having been pretufted with a yarn which was not adversely affected by the heating conditions, said heating having caused an increase in tuft density of at least 130% relative to the initial tuft density, said densified primary backing having been provided with a secondary backing after densification of said tufting.

The primary backing materials which may be used to practice the present invention comprise heat sensitive backings of standard construction; however, because of the purpose of the present invention, the backings must be capable of shrinking to not more than 85% of their initial width and length dimensions. These backings may comprise standard weave backings such as those having from about 24 warp strands per inch and about 13 weft strands per inch. Loosely woven backings are not preferred because excessive heat treatment is necessary to achieve the high densification desired according to the present invention. Preferably, the primary backing material will comprise a spun-bonded polyolefin material, and most preferably, a spun-bonded polypropylene material. An example of such material is Typar ® which is sold by du Pont.

The primary backing may be tufted by means well known in the art using yarns which will be stable at the temperatures used to induce shrinkage of the primary backing. Suitable tufting materials may include nylon yarns, polyester yarns, cellulosic yarns and acrylic yarns. However, because the shrinkage conditions will utilize temperatures which are not less than 300° F., materials such as PVC yarn and polyolefin yarn are often unsatisfactory.

The tufted primary backing is placed on a tenter frame which can control the dimension to which the tile ultimately shrinks. The tenter frame may be fixed at a final dimension, as illustrated in the following examples, or an adjustable tenter frame which can apply an adjustable tension can be used, the selection of the frame being within the skill of an ordinary artisan.

The objective of the invention is to cause shrinkage of the primary backing such that the tuft density is increased to at least 130% of the initial density, and preferably to at least 150% of the initial density. It is also preferred that the densification occur uniformly in both a machine direction and an across machine direction.

Once the shrinkage is complete, the densified fabric will be provided with a secondary backing. The secondary backing may be any type which is well known in the art, including woven secondary backings which are applied using adhesives, foamed secondary backings, hot-melt secondary backings and latex secondary backings.

The advantages of the present invention will become more apparent from the following examples which are provided by way of illustration and not limitation.

TABLE I

INITIAL NYLON TUFTED BACKING CHARACTERISTICS

| Commercial Name | Primary Backing | Weight (Oz./Yd.$^2$) | Type Construction | Weave (Tufts/in Warp × Weft) |
|---|---|---|---|---|
| Sculptured Touch | Typar | 3.2 | Spun Bonded | — |
| Elegant Expressions | Polypropylene | 3.9 | Woven | 24 × 15 |
| Commendation | Polypropylene | 3.5 | Woven | 24 × 13 |
| City Line | Polypropylene | 4.0 | Woven | 24 × 15 |
| Windward | Polypropylene | 3.6 | Woven | 24 × 13 |
| Engravers Mark | Typar | 4.2 | Spun Bonded | — |
| Very Impressive Print | Typar | 4.2 | Spun Bonded | — |
| Diamo | Polypropylene | 3.3 | Woven | 24 × 11 |
| Verdict | Polypropylene | 3.9 | Woven | 24 × 15 |

TABLE II

SHRINKAGE DATA

| Commercial Name | Initial Inch AMD | Initial Inch MD | Final Inch AMD | Final Inch MD | Initial Tuft Density (Tufts Per Inch$^2$) | Final Tuft Density (Tufts Per Inch$^2$) | Percent Density Increase |
|---|---|---|---|---|---|---|---|
| Sculptured Touch | 12.8 | 10.5 | 20 | 16 | 134.4 | 320 | 238 |
| Elegant Expressions | 10 | 10 | 14 | 12.5 | 100 | 175 | 175 |
| Commendation | 8 | 10.5 | 11 | 14 | 84 | 154 | 183 |
| City Line | 10 | 9 | 15 | 11 | 90 | 165 | 183 |
| Windward | 12.8 | 10.5 | 17 | 15 | 134.4 | 255 | 190 |
| Engravers Mark | 12.8 | 9.5 | 18 | 11 | 121.6 | 198 | 163 |
| Very Impressive Print | 12.8 | 9.5 | 17 | 14 | 121.6 | 238 | 196 |
| Diamo | 5.3 | 7 | 8 | 11 | 37.1 | 88 | 237 |
| Verdict | | | | | | | |

(Not measured; heating converted a 24.5-inch by 24.5-inch piece to a dimension of 20 inches by 20 inches)

EXAMPLES

The following tufted primary carpet backings having a dimension of 26 inches AMD by 46 inches MD were placed on a 20-inch AMD by 36-inch MD tenter frame such that the edges of the samples were hooked and the samples hung loosely in the frame. Each sample was subjected to a temperature of about 350° F. for about 10 minutes, thereby inducing the backing to shrink and densification to occur. After heating, each sample was cooled to room temperature and examined to determine the amount of densification. Information concerning the primary backing used for each sample is set forth in Table I, and the shrinkage information is described in Table II.

After evaluating each sample, two of the densified backings (City Line and Verdict) were back-coated with a preformed conventional 1/16-inch polyurethane secondary backing which was acquired from Textile Rubber Company. Adhesion was achieved through the use of a water-based pressure sensitive adhesive, F-114, from Franklin Chemical Company. Two samples (Elegant Expressions and Engravers Mark) were also backed with jute using a conventional thermoset adhesive. None of the samples showed evidence of curl.

What is claimed is:

1. A process for forming a densified tufted carpet tile, said process comprising the steps of
   selecting a heat shrinkable primary backing material, said backing material being capable of shrinking to not more than 85% of its initial dimensions when subjected to a temperature of not less than 300° F.;
   tufting said backing with a yarn which will not be adversely affected by the shrinkage conditions;
   placing the tufted backing on a tenter frame;
   subjecting the tufted backing to a temperature not less than 300° F., thereby inducing said backing to shrink so as to increase the tuft density by at least 130%; and
   applying a secondary backing to the densified tufted backing.

2. The process of claim 1 wherein said primary backing is a spun bonded backing.

3. The process of claim 2 wherein said backing comprises polyolefin fiber.

4. The process of claim 3 wherein said fiber is polypropylene.

5. The process of claim 1 wherein said tuft density is increased by at least 150%.

6. A densified tufted carpet tile comprising tufting, a primary backing and a secondary backing, said tile being obtained from the heating on a tenter frame of a heat shrinkable primary backing at a temperature of not less than about 300° F. such that said backing shrank to not more than 85% of its initial dimensions, said backing having been pretufted with a yarn which was not adversely affected by the heating conditions, said heating having caused an increase in tuft density of at least 130% relative to the initial tuft density, said densified primary backing having been provided with a secondary backing after densification of said tufting.

7. The product of claim 6 wherein said primary backing is a spun bonded backing.

8. The product of claim 7 wherein said backing comprises polyolefin fiber.

9. The product of claim 8 wherein said fiber is polypropylene.

10. The product of claim 6 wherein said tuft density was increased by at least 150%.

* * * * *